July 3, 1956  W. T. ABEL  2,753,063
BOAT LOADING AND CARRYING DEVICE FOR AN AUTOMOBILE
Filed Aug. 4, 1955  3 Sheets-Sheet 1

INVENTOR.
William T. Abel
BY
Frease & Bishop
ATTORNEYS

July 3, 1956   W. T. ABEL   2,753,063
BOAT LOADING AND CARRYING DEVICE FOR AN AUTOMOBILE
Filed Aug. 4, 1955   3 Sheets-Sheet 2

INVENTOR.
William T. Abel
BY
Frease & Bishop
ATTORNEYS

July 3, 1956   W. T. ABEL   2,753,063
BOAT LOADING AND CARRYING DEVICE FOR AN AUTOMOBILE
Filed Aug. 4, 1955   3 Sheets-Sheet 3
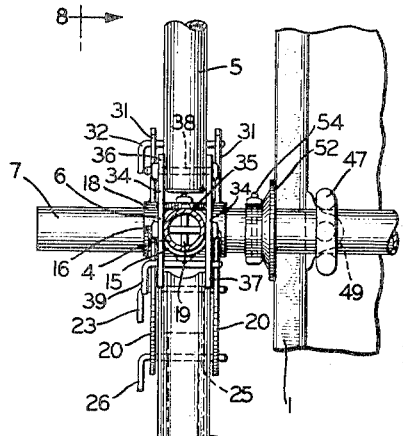
Fig.7
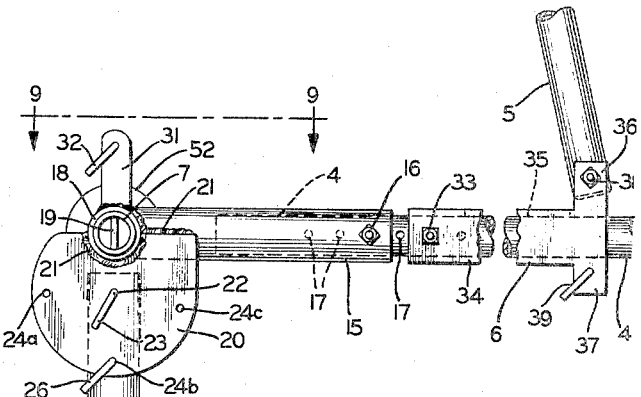
Fig.8
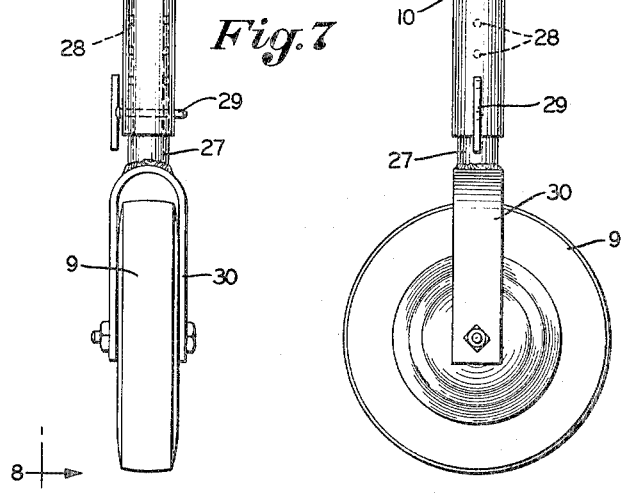
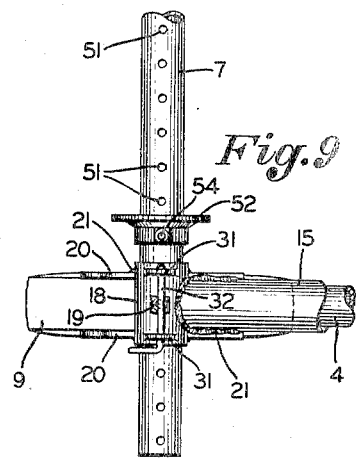
Fig.9
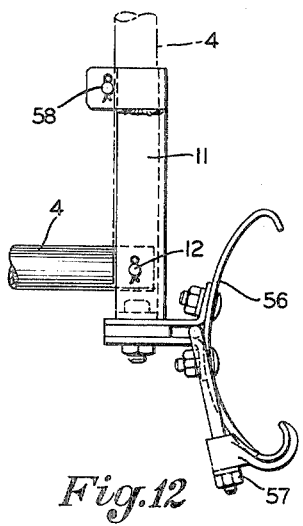
Fig.12
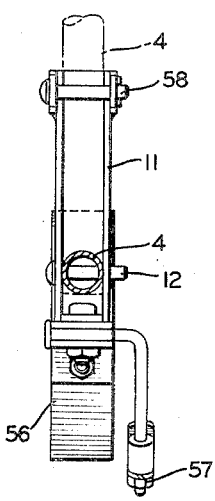
Fig.13
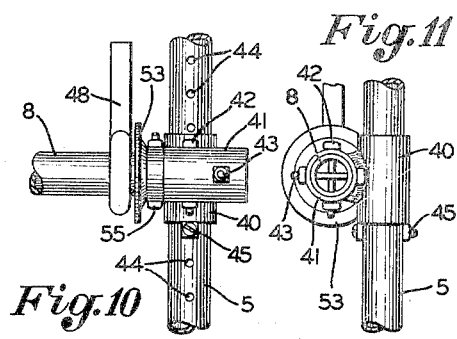
Fig.10   Fig.11
INVENTOR.
William T. Abel
BY Frease & Bishop
ATTORNEYS

United States Patent Office 2,753,063
Patented July 3, 1956

2,753,063

BOAT LOADING AND CARRYING DEVICE FOR AN AUTOMOBILE

William T. Abel, Cadiz, Ohio

Application August 4, 1955, Serial No. 526,366

8 Claims. (Cl. 214—450)

This invention relates to a new and improved boat loading and carrying device for an automobile.

For those who own and transport boats to and from a body of water there has existed a long-standing difficulty in loading and unloading the boat from the top of an automobile. The task usually requires two or more men in order to avoid damaging either the automobile, the boat, or both. This is particularly true where increasing sizes and weights of boats are used.

Various devices for loading and unloading boats from the top of an automobile have been in use, but most of them have inherent difficulties. Among these difficulties is the fact that the combined weight of the boat and the device frequently is too much for the average adult to maneuver. In other words, most of the boat loading devices currently in use do not include elements that facilitate the boat loading and unloading operations.

It has been discovered that the aforesaid difficulty may be overcome by providing a loading device having a linkage connection between parts as well as a sliding connection between the boat and two of the parts which distributes the weight of the assembly in successive stages to facilitate and enhance the maneuverability of the boat into and out of the loading position.

Another difficulty with boats is that of storing the boat as well as carrying it to and from a carrying vehicle before and after loading or unloading. The device of the present invention is provided with a wheel assembly by which the boat may be rolled to and from the vehicle as well as providing means for storing the boat when not in use.

Accordingly, it is a general object of this invention to provide a device for loading and unloading boats on top of an automobile in a comparatively easy manner.

It is another object of this invention to provide a device for loading and unloading boats on an automobile in a manner which endangers neither the boat nor the automobile.

It is another object of this invention to provide a device for maneuvering the boat to and from an automobile by one person.

It is another object of this invention to provide a device by which a boat may be stored when not in use.

Finally, it is an object of this invention to provide a device for loading and unloading the boats which obtains the foregoing desiderata in a simple and effective manner.

These and other objects and advantages apparent to those skilled in the art from the following description and claims may be attained, the stated results achieved, and the described difficulties overcome, by the discoveries, principles, apparatus, parts, combinations, subcombinations and elements which comprise the present invention, the nature of which is set forth in the following statement, a preferred embodiment of which—illustrative of the best mode in which applicant has contemplated applying the principles—is set forth in the following description, and which is particularly and distinctly pointed out and set forth in the appended claims forming part hereof.

Generally, the nature of the boat loading and carrying device of the present invention may be stated as including a pair of spaced pivot arms pivotally connectable at one end to the lower portion of a vehicle or automobile, a first cross bar connected to and between the other ends of the pivot arms, the cross bar being detachably connected to a pair of oar locks on the boat, a link pivotally attached to each pivot arm at one end, a support arm pivotally connected to the other end of each link, a second cross bar being detachably connected to another pair of oar locks on the boat, whereby the boat may be loaded or unloaded to and from the top of an automobile in successive stages of positions of the frame and the boat, and a pair of wheels attached to the radial arms for maneuvering the boat into and out of position prior to attaching the device to the automobile.

In the accompanying drawings which are illustrative of the preferred embodiment of the invention, by way of example, and in which similar numerals refer to similar parts throughout the various figures of the drawings:

Fig. 7 is an enlarged, fragmentary, elevational view showing a portion of the boat loading device, taken on the line 7—7 of Fig. 3;

Fig. 8 is a side view of the portion of the boat loading device, taken on the line 8—8 of Fig. 7;

Fig. 9 is a fragmentary plan view, taken on the line 9—9 of Fig. 8;

Fig. 10 is an enlarged, fragmentary view of another portion of the boat loading device, taken on the line 10—10, Fig. 6;

Fig. 11 is an end view of the part shown in Fig. 10;

Fig. 12 is an enlarged side view of the bumper attachment by which the loading device is secured to the automobile;

Fig. 13 is an elevational view of the bumper attachment shown in Fig. 12; and

Figure 1:
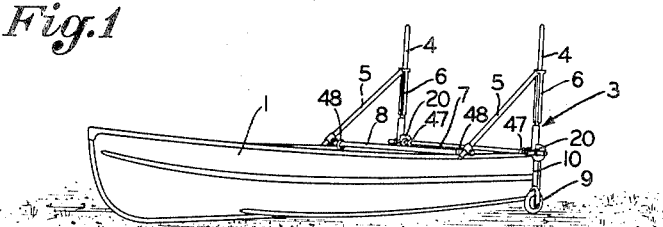
Fig. 1 is a perspective view of the device of the present invention attached to a boat.

A device for loading, unloading and carrying a boat 1 on an automobile 2, as well as for storing the boat when not in use, is generally indicated at 3 in the drawings. It comprises a pair of spaced pivot or radial arms 4, a pair of spaced support arms 5, and a pair of connecting links 6 between the pivot arms 4 and the support arms 5.

Also, the device 3 comprises a pair of transverse or cross bars 7 and 8 extending between the spaced arms 4 and 5, respectively. That is, the cross bar 7 is connected at its extremities to the ends of the pivot arms 4 and the cross bar 8 is slidably connected at its extremities to the ends of the support arms 5.

For maneuvering the boat 1 over the ground or other surface the device 3 is provided with a pair of wheels 9 mounted at one end of a pair of props or shafts 10. With boats of increasingly greater weight, it is more desirable to provide the device 3 with wheels 9 for maneuvering the boat 1 as well as for storing the boat when not in use.

In addition, a pair of mounting brackets 11 are provided on the bumper of the automobile 2 to which the ends of the pivot arms 4 are attached by detachable pins 12.

Figure 6:
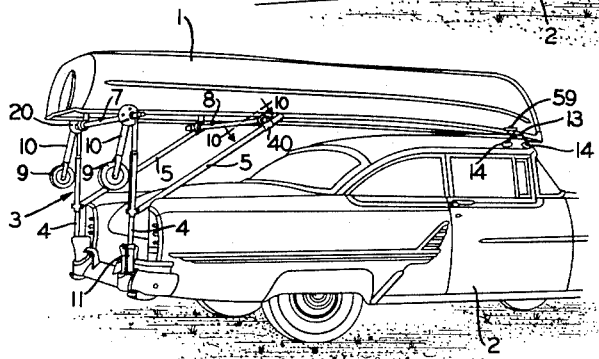
Fig. 6 is a perspective view showing the boat finally attached to the top of an automobile.

Further, there may be provided a cross rail 13 on the top of the automobile 2 to support the bow of the boat 1 in place as shown in Fig. 6. The cross rail 13 is secured to the automobile top by means of suction cups 14.

The pivot arms 4 constitute the primary support members of the device 3. As was indicated above, the ends of the arms 4 remote from the boat 1 may be attached to the mounting brackets 11 on the bumper of the automobile 2. The other ends of the pivot arms 4 are telescopically enclosed within a sleeve 15 (Fig. 8) where they are secured by bolts 16 and adjusted for the proper height of the automobile by spaced holes 17 in the arm 4. In turn, the end of the sleeve 15 is secured to a socket 18, the axis of which extends transversely to that of the sleeve. The cross bar 7 extends through the socket 18 as shown in Figs. 7 and 8 where it is retained by means of a bolt 19.

In addition, each assembly of the sleeve 15 and the socket 18 includes a pair of plates or brackets 20 spaced from each other on each side of the sleeve 15. The assembly of the sleeve 15, socket 18 and plates 20 are secured together by weld 21.

Figure 2:
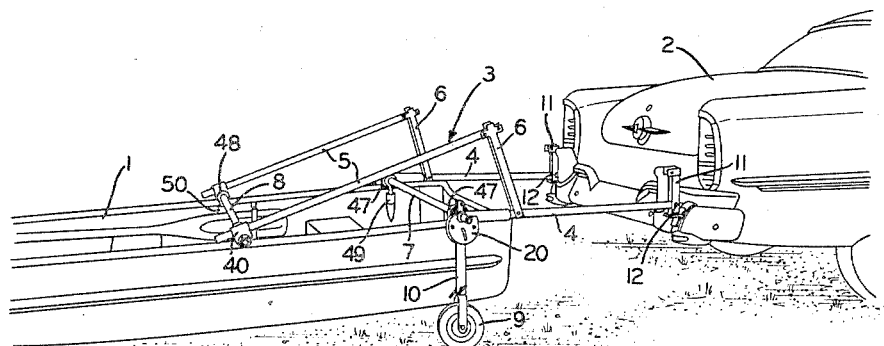
Fig. 2 is a perspective view showing the manner of connection of the loading device to the rear bumper of an automobile.
Figure 3:
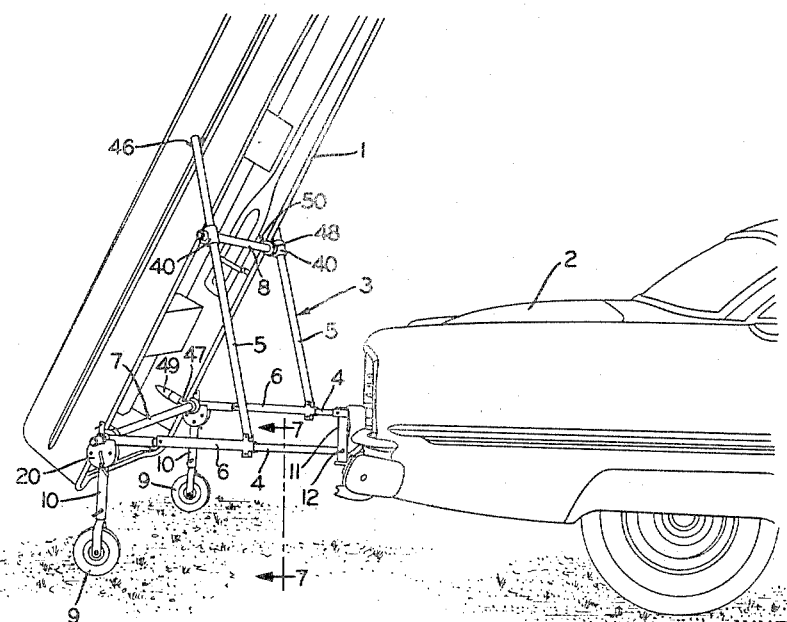
Fig. 3 is a perspective view showing an intermediate stage of loading or unloading of the boat with respect to the automobile.

In Fig. 8 the plates 20 are provided with a central pivot hole 22 to which the shaft 10 is attached by means of a detachable pin 23. Moreover, the plates 20 include three spaced holes 24a, 24b, and 24c radially disposed with respect to the pivot hole 22 at approximately 90° with respect thereto. The holes 24 register with a hole 25 (Fig. 7) in the shaft 10 so that the shaft 10 may be disposed at various angles with respect to the pivot arm 4 and be retained at said angles by insertion of a detachable pin 26 through the aligned holes 24 and 25. The position of the shaft 10 as shown in Fig. 8 is the position which supports the boat 1 when the device 3 is attached to the automobile 2 as shown in Figs. 2 and 3.

In Figs. 7 and 8 a shaft 27 is telescopically disposed within the shaft 10 and both shafts are provided with equally spaced holes 28 for the purpose of adjusting the total distance between the wheels 9 and the cross bars 7 according to the height of the particular boat 1 in use. For this purpose a pin 29 is used. To the lower end of the shaft 27 is secured a bifurcated member 30 to which the wheels 9 are attached.

On the side of the socket 18 opposite the plates 20 is a pair of spaced lugs 31 between which is mounted a detachable pin 32. When the device 3 is not in use, the arms 5 may be collapsed against the arms 4 and retained in place between the lugs 31 by the pins 32.

The connecting links 6 are secured to the respective pivot arms 4 by a bolt 33 (Fig. 8) extending through one of the holes 17 in the arms 4. The links 6 are elongated channel members having oppositely disposed flanges 34 and the web 35. The ends of the links 6 remote from the bolts 33 are provided with oppositely extending pairs of ears 36 and 37. As shown in Figs. 7 and 8, the ears 36 extend upwardly from the side of the link 6 on which the web 35 is disposed and the arm 5 is pivotally secured thereto by means of a bolt 38. On the other hand, the ears 37 extend in the opposite direction from the ears 36 and a detachable bolt 39 extends therebetween for the purpose of securing the link 6 to the arm 4 when desirable as will be pointed out hereinbelow.

As shown in Figs. 10 and 11, the cross bar 8 is slidably attached to each support arm 5 by sockets 40 which are slidably disposed on their respective arms 5. To each socket 40 is secured a socket 41 in which the extremities of the cross bars 8 are secured by means of bolts 42 and 43. Each arm 5 is provided with equally spaced apertures 44 in one of which may be inserted a stop bolt 45 to limit the sliding movement of the sleeves 40. At the extremity of each arm 5 is a similar stop bolt 46 (Fig. 3) to prevent the sleeves 40 from sliding off the outer ends of the arms 5.

Figure 14:
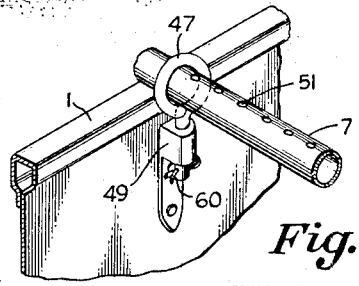
Fig. 14 is an enlarged fragmentary perspective view of the eye-bolt and socket assembly.

Each cross bar 7 and 8 may be provided with a pair of eye-bolts 47 and 48 respectively, the ends of which may be seated in sockets 49 and 50, respectively, on the inner sides of the boat 1 and locked thereto by conventional means, such as a cotter pin 60, as shown in Fig. 14. As an alternative to the eye-bolts 47 and 48, oar locks (not shown) may be used.

Inasmuch as the width of boats varies, the cross bars 7 and 8 are provided with equally spaced apertures for the purpose of varying the spacing between the arms 4 and 5. Accordingly, as shown in Fig. 9, the cross bar 7 includes spaced apertures 51 to which the socket 18 may be secured by the bolt 19. Similarly, cross bar 8 is provided with apertures by which bolts 42 and 43 (Figs. 10 and 11) are attached.

In addition, the cross bars 7 and 8 are provided with a pair of spacers 52 and 53, respectively, which are secured preferably at equal distances from the center axis of the device 3. The spacers 52 are secured against lateral movement on the cross bar 7 by means of bolts 54 (Fig. 7) extending through the apertures 51. Likewise, spacers 53 are retained against lateral shifting by bolts 55 on the cross bar 8 (Fig. 10). The spacers 52 and 53 may be used instead of adjusting the lateral distance between the arms 4 and 5, to secure the eye-bolts 47 and 48 on their respective cross bars 7 and 8. That is to say, the spacers 52 and 53 may be set for a boat 1 having a given width and thereby prevent a boat from thereafter shifting laterally on the cross bars 7 and 8.

As shown in Figs. 12 and 13, the mounting brackets 11 are provided at their lower ends with clamps 56 for securing to a bumper of an automobile in a conventional manner. Each clamp includes a tightening bolt and nut assembly 57.

*Operation*

The operation of the device 3 may be understood by referring to the Figs. 1 through 6 consecutively. In Fig. 1 the device 3 is shown as it is first attached to the boat 1 by means of the eye-bolts 47 and 48 or oar locks, as preferred. In the position shown in Fig. 1 the device 3 has the pivot arms 4 extending vertically with the support plates 20 for the shafts 10 and wheels 9 positioned so that the holes 24a (Fig. 8) are aligned with holes 25 in the shafts 10. In this manner the bow of the boat 1 may be lifted and rolled on the wheels 9 into alignment with the mounting brackets 11 on the bumper of the automobile 2.

It is to be pointed out, however, that the device 3 may also be used in the position shown in Fig. 1 for maneuvering the boat 1 away from the automobile either to a suitable storing position or to the edge of the water. Where the boat is to be stored, the device 3 need not be removed from the boat. Thus, the device 3 serves as a suitable means for storing the boat when not in use.

When the stern of the boat 1 is properly aligned with respect to the mounting brackets 11, the pins 26 (Fig. 8) are removed from the support plates 20 and the pins 39 (Fig. 8) are removed from the ears 37. Thereafter, the pivot arms 4 are rotated in a vertical plane from the upright position of Fig. 1 to the horizontal position of Fig. 2. In the latter position the ends of the arms 4 are attached to the mounting brackets 11 by means of detachable pins 12. During the rotation of the arms 4 the plates 20 also rotate to the position shown in Fig. 8 where the pins 26 may be inserted through the aligned holes 24b and 25. Also, during the rotation of the arms 4 the links 6 move with the arms 4 from a position above the cross bar 7 to a position intermediate said bar and the mounting brackets 11.

The next step is to raise the boat 1 from the position of Fig. 2 to that of Fig. 3. During this step the assembly rotates about the axis of the cross bar 7 until the links 6 come to rest upon the pivot arms 4. Thereafter, detachable pins 39 are reinstated into the ears 37 in order to lock the links 6 and bars 4 together as shown in Fig. 8. Also, during the change of positions of the boat from Fig. 2 to 3, the sleeves 40 slide from the extremities of the arms 5 to the stop bolts 45 (Figs. 10 and 11) in order to permit the center of gravity of the boat 1 to be more closely aligned with the mounting brackets 11.

If the sleeves 40 were not slidable along the bars 5, the boat 1 would be in a more vertical position than that shown in Fig. 3 so that the center of gravity thereof would be further from the pins 12 in the mounting brackets 11, which pins constitute the next pivot point about which the boat is to be rotated. By adjusting the positions of the stop bolts 45 in accordance with the physical abilities of the person usually loading and unloading the boat as well as in accordance with the height of the automobile involved, the angle of the boat as shown in Fig. 3 may be adjusted so that the center of gravity is closer or further from the mounting brackets 11. Thus, a person with less physical ability may prefer the sleeves 40 to slide further along the support arms 5 so that the boat is in a lower position than that shown in Fig. 3, thereby facilitating the next operation. At the same time, where a heavier boat is used, a person may find it more desirable also to have the boat slide to the lower position than that shown in Fig. 3.

Figure 4:
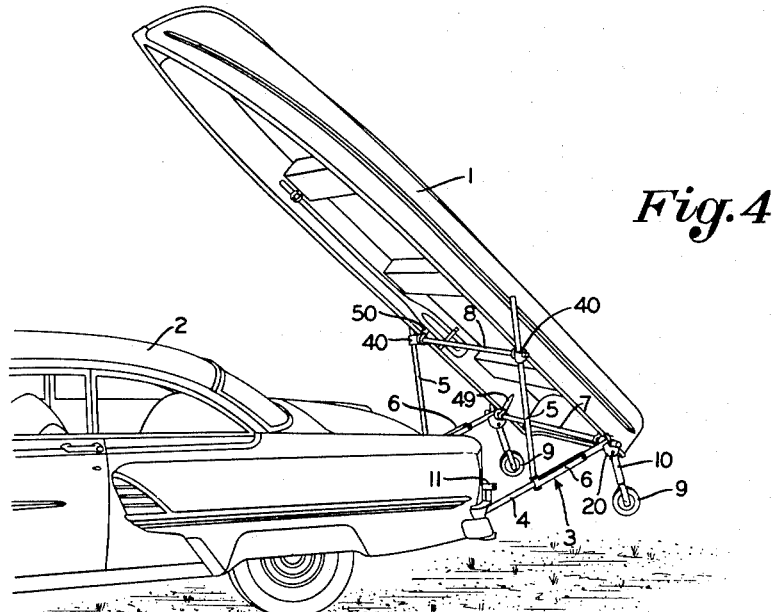
Fig. 4 is a perspective view showing another intermediate stage in the loading or unloading of the automobile.
Figure 5:
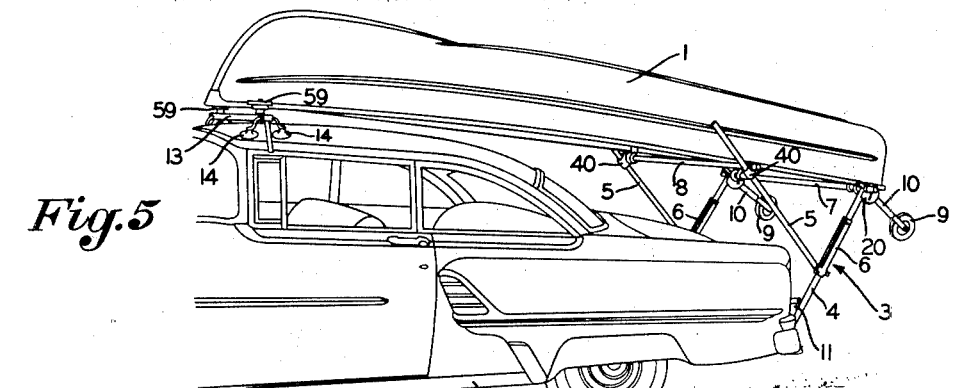
Fig. 5 is a perspective view showing still another intermediate stage in the loading or unloading of a boat with respect to an automobile.

The boat 1 is then lifted and the assembly of the boat and the device 3 rotates about the pins 12 as shown in Fig. 4. This operation continues until the bow of the boat 1 comes to rest upon the cross rail 13 as shown in Fig. 5. In this position the pivot arms 4 extend diagonally from the mounting brackets 11 and the sleeves 40 are at the lowermost position of the support arms 5 against stop bolts 45.

The next step of the operation is to push the boat forward until the pivot arms 4 are vertical and contained within the mounting brackets 11, which position is shown by the broken lines in Fig. 12. The arms 4 are then locked in place with respect to the mounting brackets 11 by means of detachable pins 58 which are mounted at the upper ends of the brackets 11, substantially as shown in Figs. 12 and 13.

Thereafter, the bow of the boat 1 may also be secured in place by tightening a pair of spaced clamps 59 of a conventional nature against the rim of the boat.

Finally, the wheels 9 may be lowered from the position of Fig. 5 to that of Fig. 6 by detaching the pins 26 and aligning the holes 25 in the shafts 10 with the holes 24c in the plates 20, whereafter the pins 26 may then be reinserted to hold the wheels 9 rigidly in position as shown in Fig. 6.

Accordingly, the device of the present invention provides a loader and carrying means for loading and unloading boats from the top of an automobile. The device is so constructed as to provide a series of pivot points, rather than a single pivot point, about which the boat rotates during the loading and unloading operations. In this manner the task of raising the boat from the ground to the top of an automobile is greatly facilitated because the pivot points are disposed to provide simple stages of lifting. Thus, the boat is first rotated about the cross bar 7 and at the same time the slidable sleeves 40 move along the support arms 5 in a counterbalancing action as described above. The next rotation point is that of the pins 12 in the mounting brackets 11. Between these two stages of operation the device 3 rigidly supports the boat 1 in place, the connecting links 6 coming into operation as the boat is first rotated to secure the device 3 in a more rigid assembly for the next stage of operation. After the bow of the boat comes to rest upon the cross rail 13 on the top of the car, the last stage of the operation is performed by pushing the boat forward, thereby bringing the pivot arms 4 into a reinforced and locked position with respect to the mounting brackets 11. At the same time the sleeves 40 slide along the support arms 5 to the stops 46 at the ends remote from the links 6.

Mainfestly, for unloading the boat 1 the loading steps are followed in the reverse order.

In addition, the device 3 may be used for other articles such as ladders, boards for paper hangers and the like.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein is by way of example, and the scope of the present invention is not limited to the exact details of construction shown.

Having now described the features, constructions and principles of invention, the characteristics of the boat loading and carrying apparatus, and the advantageous, new and useful results provided; the new and useful discoveries, principles, parts, elements, combinations, sub-combinations, structures and arrangements, and mechanical equivalents obvious to those skilled in the art are set forth in the appended claims.

I claim:

1. A boat loading and carrying device for automobiles including a pair of spaced pivot arms pivotally connectable at one of their ends to the lower portion of an automobile on which a boat is to be loaded, a first cross bar connected to the other ends of the pivot arms, means on the cross bar for connecting to a boat, a link pivotally connected at one end to each pivot arm, a support arm pivotally connected at one end to the other end of the link, a second cross bar slidably connected to the support arms, and means on the second cross bar for connecting to the boat at a location spaced from the first cross bar.

2. A boat loading and carrying device for automobiles including a pair of spaced pivot arms pivotally connectable at one of their ends to the lower portion of a vehicle on which a boat is to be loaded, a first cross bar connected to the other ends of the pivot arms, means on the cross bar for connecting to the boat, a link pivotally connected at one end to each pivot arm, a support arm pivotally connected at one end to the other end of the link, a second cross bar slidably connected to the support arms, means on the second cross bar for connecting to the boat at a location spaced from the first cross bar, a wheel-supporting prop pivotally connected at one end to each of said other ends of the pivot arms, and a wheel attached to the other end of each of said props.

3. A boat loading and carrying device for automobiles including a pair of spaced pivot arms pivotally connectable at one of their ends to the lower portion of a vehicle on which a boat is to be loaded, a first cross bar connected to the other ends of the pivot arms, means on the cross bar for connecting to a boat, a link pivotally connected at one end to each pivot arm, a support arm pivotally connected at one end to the other end of the link, a second cross bar slidably connected to the support arms, means on the second cross bar for connecting to the boat at a location spaced from the first cross bar, and a pair of stop members on each cross bar selectively releasably mounted at spaced distances with respect to the opposite ends of the bars.

4. A boat loading and carrying device for automobiles including a pair of spaced pivot arms pivotally connectable at one of their ends to the lower portion of a vehicle on which a boat is to be loaded, a first cross bar connected to the other ends of the pivot arms, means on the cross bar for connecting to a boat, a link pivotally connected at one end to each pivot arm, a support arm pivotally connected at one end to the other end of the link, a second cross bar slidably connected to the support arms, means on the second cross bar for connecting to the boat at a location spaced from the first cross bar, and the links being pivotally connected to the pivot arms near the end to which the first cross bar is connected.

5. A boat loading and carrying device for automobiles including a pair of spaced pivot arms pivotally connectable at one of their ends to the lower portion of a vehicle on which a boat is to be loaded, a first cross bar connected to the other ends of the pivot arms, means on the cross bar for connecting to a boat, a link pivotally connected at one end to each pivot arm, a support arm pivotally connected at one end to the other end of the link, a second cross bar slidably connected to the support arms, means on the second cross bar for connecting to the boat at a location spaced from the first cross bar, and limit stops on the support arms selectively mounted for limiting the slidability of the second cross bar.

6. A boat loading and carrying device for automobiles including a pair of spaced pivot arms pivotally connectable at one of their ends to the lower portion of a vehicle on which a boat is to be loaded, a first cross bar connected to the other ends of the pivot arms, means on the cross bar for connecting to a boat, a link pivotally connected at one end to each pivot arm, a support arm pivotally connected at one end to the other end of the link, a second cross bar slidably connected to the support arms, means on the second cross bar for connecting to the boat at a location spaced from the first cross bar, a wheel-supporting prop pivotally connected at one end to each of said other ends of the pivot arms, a wheel attached to the other end of each of said props, at least one prop support plate connected to the end of the pivot arm to which the first cross bar is connected, and each plate having three prop support positions approximately 90° apart.

7. A boat loading and carrying device for automobiles having a frame, a pair of mounting brackets connectable to the bumper of an automobile, and a cross rail attachable to the top of an automobile; the frame including a pair of spaced pivot arms pivotally connectable separately at one of their ends to the mounting brackets, a first cross bar connected to the other ends of the pivot arms, means on the cross bar for connecting to a boat, a link pivotally connected at one end to the pivot arm near the end to which the first cross bar is connected, a support arm pivotally connected at one end to the other end of the link, a sleeve slidably mounted on each support arm, a second cross bar selectively releasably attached to and between the sleeves, means on the second cross bar for connecting to the boat at a location spaced from the first cross bar, a wheel supporting prop pivotally connected to the ends of the pivot arms to which the first cross bar is connected, and a wheel at the other end of each prop.

8. A boat loading and carrying device for an automobile, the boat having two pairs of oar locks at spaced intervals, the device having a frame, a pair of mounting brackets connectable to the bumper of an automobile, and a cross rail attachable to the top of an automobile; the frame including a pair of spaced pivot arms pivotally connectable separately at one of their ends to the mounting brackets, a first cross bar connected to the other ends of the pivot arms, the first cross bar being releasably connected to one of the pair of oar locks, a link pivotally connected at one end to the pivot arm near the end to which the first cross bar is connected, a support arm pivotally connected at one end to the other end of the link, a sleeve slidably mounted on each support arm, a second cross bar selectively releasably attached to and between the sleeves, the second cross bar being releasably attached to the other pair of oar locks, a wheel-supporting prop pivotally connected to the ends of the pivot arms to which the first cross bar is connected, and a wheel at the other end of each prop.

References Cited in the file of this patent

UNITED STATES PATENTS 2,584,163    Squires    Feb. 5, 1952